(12) United States Patent
Liu et al.

(10) Patent No.: US 8,339,194 B2
(45) Date of Patent: Dec. 25, 2012

(54) DEMODULATOR, A METHOD FOR DEMODULATING AN ASK SIGNAL AND AN ON-BOARD UNIT INCLUDING THE DEMODULATOR

(75) Inventors: Jiazhou Liu, Shanghai (CN); Dawei Guo, Shanghai (CN)

(73) Assignee: Beken Corporation, Shanghai (CN)

( * ) Notice: Subject to any disclaimer, the term of this patent is extended or adjusted under 35 U.S.C. 154(b) by 223 days.

(21) Appl. No.: 12/973,938

(22) Filed: Dec. 21, 2010

(65) Prior Publication Data

US 2012/0147996 A1    Jun. 14, 2012

(30) Foreign Application Priority Data

Dec. 2, 2010    (CN) .......................... 2010 1 0568839

(51) Int. Cl.
*H03D 1/00*    (2006.01)

(52) U.S. Cl. ........................................ 329/369; 329/347
(58) Field of Classification Search .................. 329/369, 329/347

See application file for complete search history.

(56) References Cited

U.S. PATENT DOCUMENTS

| | | | | |
|---|---|---|---|---|
| 7,839,210 B2* | 11/2010 | Bas et al. | ....................... | 329/369 |
| 2008/0169873 A1* | 7/2008 | Toda | .............................. | 329/369 |

* cited by examiner

*Primary Examiner* — Joseph Chang
(74) *Attorney, Agent, or Firm* — Perkins Coie LLP; Aaron Wininger (57) ABSTRACT

A new demodulator with low power consumption and high gain which is suitable for CMOS integration is provided. The demodulator makes use of a MOS configured in a "common-source" status so as to achieve a desirable gain.

12 Claims, 6 Drawing Sheets

DEMODULATOR, A METHOD FOR DEMODULATING AN ASK SIGNAL AND AN ON-BOARD UNIT INCLUDING THE DEMODULATOR

CLAIM OF PRIORITY

This application claims priority to Chinese Application number 201010568839.7 entitled "A DEMODULATOR, A METHOD FOR DEMODULATING AN ASK SIGNAL AND AN ON-BOARD UNIT INCLUDING THE DEMODULATOR", filed on Dec. 13, 2010, which is incorporated herein by reference.

TECHNICAL FIELD

The present application relates to demodulation of an amplitude shift keying (ASK) signal, particularly to a demodulator and a method for an ASK signal, and an on board unit including the demodulator.

BACKGROUND OF THE INVENTION

ASK modulation is widely adopted in communication systems. For example, in Electronic Toll Collection (ETC) systems, a wake-up signal broadcasted by an Road Side Unit (RSU) is typically modulated with ASK.

Conventionally, to conserve power, an ASK signal is demodulated by means of Schottky Barrier Diodes (SBD) or source followers. However, SBDs are not compatible with CMOS integration while source followers can only achieve very limited gains.

Therefore, a new demodulator with low power consumption and high gain which is suitable for CMOS integration becomes highly desirable.

BRIEF SUMMARY OF THE INVENTION

According to an embodiment of the invention, there is provided a demodulator, comprising:

a rectification circuit comprising: a DC block, a first resistor, a MOSFET; a current source and a second resistor, wherein an end of the DC block is configured to receive an ASK signal, another end of the DC block is connected to an end of the first resistor and a gate of the MOSFET, another end of the first resistor is configured to receive a bias voltage, the current source and the second resistor are in a parallel connection and further connected to a drain of the MOSFET so as to form a series connection, the formed series connection is set between a positive voltage source and a ground;

a filter connected to the common terminal and configured to receive a drain signal generated on the common terminal, remove carriers from the drain signal to generate a filtered signal; and a decision circuit connected to an output end of the filter and configured to receive the filtered signal and use the filtered signal to generate a base band signal.

According to another embodiment of the invention, there is provided a method for demodulating an ASK signal, comprising:

receiving an ASK signal with a demodulator, the demodulator including:

a rectification circuit comprising: a DC block, a first resistor, a MOSFET; a current source and a second resistor, wherein an end of the DC block is configured to receive an ASK signal, another end of the DC block is connected to an end of the first resistor and a gate of the MOSFET, another end of the first resistor is configured to receive a bias voltage, the current source and the second resistor are in a parallel connection and further connected to a drain of the MOSFET so as to form a series connection, the formed series connection is set between a positive voltage source and a ground;

a filter connected to the common terminal and configured to receive a drain signal generated on the common terminal, remove carriers from the drain signal to generate a filtered signal; and a decision circuit connected to an output end of the filter and configured to receive the filtered signal and use the filtered signal to generate a base band signal;

demodulating the ASK signal with the demodulator.

According to another embodiment of the invention, there is provided an on board unit of an electronic toll collection system, comprising:

a demodulator configured to demodulate an ASK signal to obtain an base band signal;

a wake-up circuit connected to the demodulator and configured to receive the base band signal;

a primary circuit connected to the wake-up circuit;

wherein the demodulator comprises:

a rectification circuit comprising: a DC block, a first resistor, a MOSFET; a current source and a second resistor, wherein an end of the DC block is configured to receive an ASK signal, another end of the DC block is connected to an end of the first resistor and a gate of the MOSFET, another end of the first resistor is configured to receive a bias voltage, the current source and the second resistor are in a parallel connection and further connected to a drain of the MOSFET so as to form a series connection, the formed series connection is set between a positive voltage source and a ground;

a filter connected to the common terminal and configured to receive a drain signal generated on the common terminal, remove carriers from the drain signal to generate a filtered signal; and a decision circuit connected to an output end of the filter and configured to receive the filtered signal and use the filtered signal to generate a base band signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-know structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Without loss of generality, reference will be made to illustrative embodiments by taking a demodulator and a method for demodulating in an ETC system as example. Those of ordinary skills in the art understand that this is only to describe the invention clearly and adequately, rather than limit the scope of the invention, which is defined by the appended claims.

Figure 1:
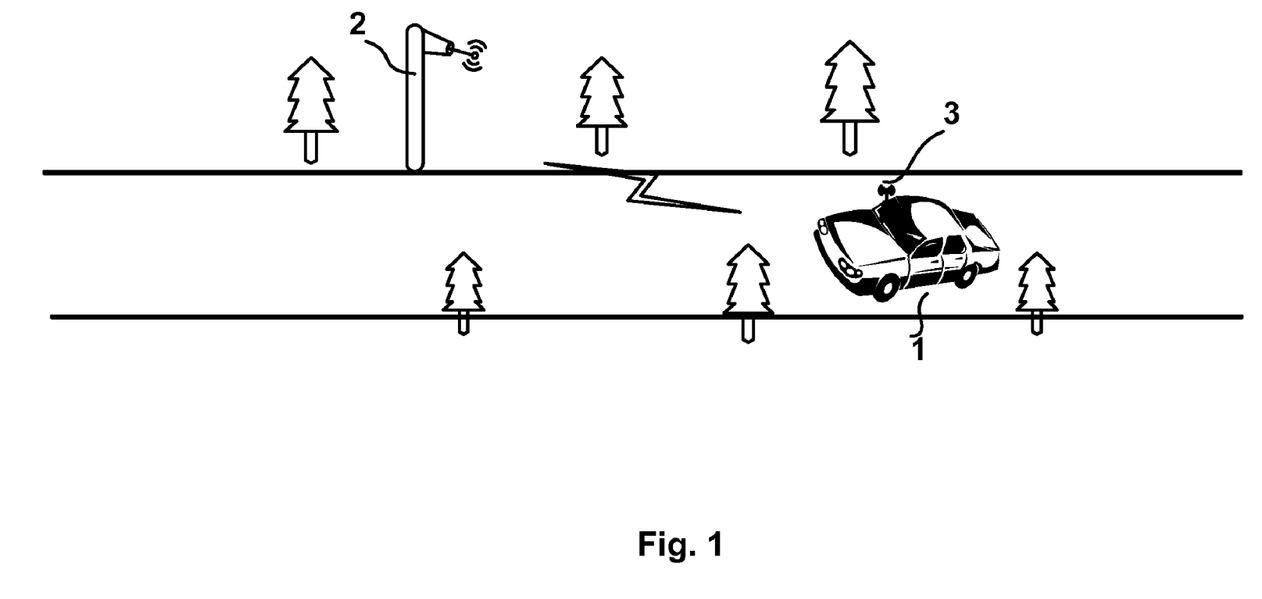
FIG. 1 is a drawing illustrating an ETC system in use.

As shown in FIG. 1, an ETC system comprises a Road Side Unit (RSU) 2 and an On Board Unit (OBU) 3. In practice, the OBU 3 is generally installed on a windshield or at other suitable place of a vehicle 1.

Figure 2:
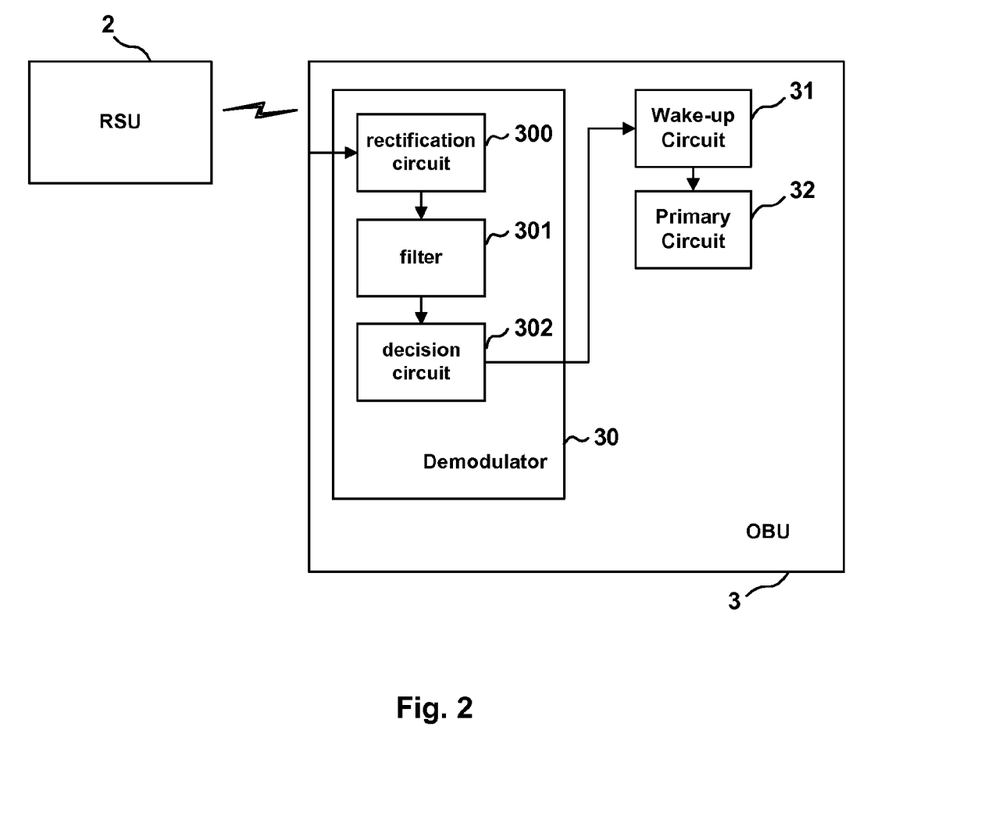
FIG. 2 is a block diagram illustrating an ETC system according to an embodiment of the invention.

The OBU 3 in FIG. 2 includes a demodulator 30, a wake-up circuit 31 and a primary circuit 32. The demodulator 30 demodulates an ASK signal and obtains a base band signal. The wake-up circuit 31 detects a frequency of the base band signal. If the frequency meets at least one preset condition, e.g., the frequency falls within a defined frequency range, the wake-up circuit 31 recognizes that a wake-up signal has been received, and then wakes up the primary circuit 32. The primary circuit 32 then establishes a connection with the RSU 2 to fulfill a payment.

The demodulator 30 in FIG. 2 includes a rectification circuit 300, a filter 301 and a decision circuit 302. Reference will be made to an exemplary detailed structure of the demodulator 30 with reference to FIGS. 3, 4.

Figure 3:
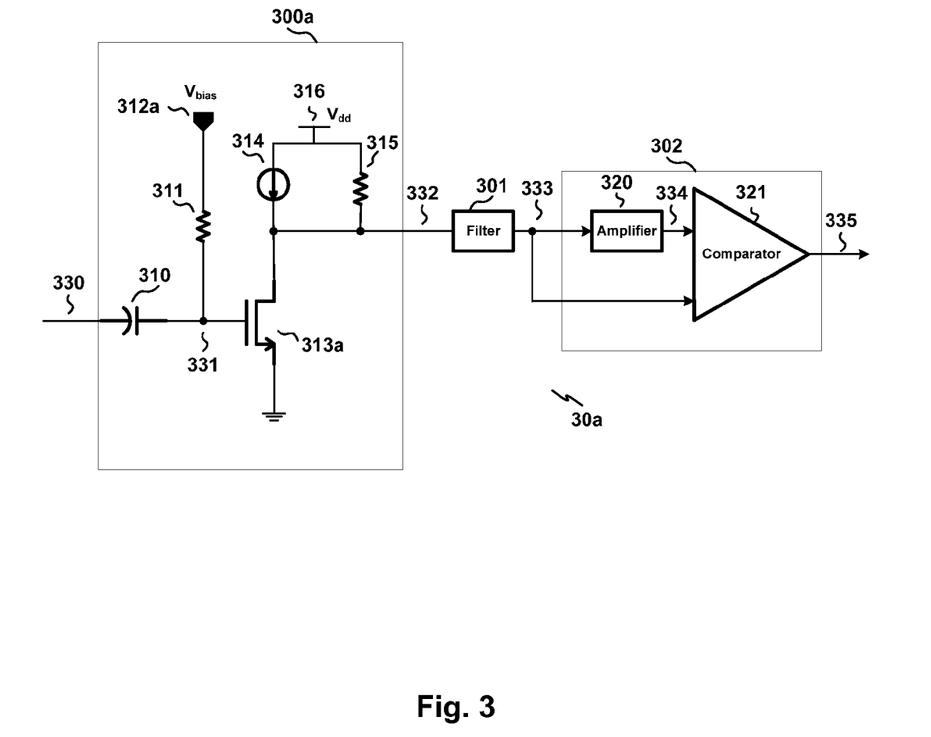
FIG. 3 is a circuit diagram illustrating a demodulator according to an embodiment of the invention.

The rectification circuit 300a rectifies an ASK signal 330 and generates a rectified signal which is suitable for the filter 301. A DC block 310 such as a capacitor is set to receive an ASK signal 330 with its positive terminal. The DC block 310 can block a DC signal such that a bias voltage supplied by a bias voltage source 312a can set an N-type MOSFET (NMOS) 313a in a sub-threshold status through a first resistor 311.

According to an embodiment of the invention, a sub-threshold status refers to a working status in which a gate-to-source voltage is lower than a threshold voltage of the NMOS 313a and there is a drain-to-source current. The drain-to-source current (IDs) is an exponential function of the gate-to-source voltage when the NMOS 313a is working under the sub-threshold status. This non-linear characteristic of MOSFETs is used for the purpose of rectification.

According to the embodiment in FIG. 3, as the source of a NMOS 313a is grounded, a gate-to-source voltage (VGS) is equal to a potential at the gate of the NMOS 313a. The $I_{DS}$ is a sum of a current of a current source 314a and a current in the second resistor 315. Since the current source is providing a constant current, the change of the current in the second resistor 315 is equal to the change of $I_{DS}$. The change of voltage at a drain of NMOS 313a can be determined with equation (1):

$$\Delta V_D = -\Delta I_{DS} R \qquad (1)$$

Where $\Delta V_D$ represents a change of the voltage at the drain and R is the resistance of the second resistor 315.

Reference will be made in detail to an application of the demodulator 300, filter 301 and decision circuit 302 in ETC systems referring to FIGS. 1-4.

Figure 4:
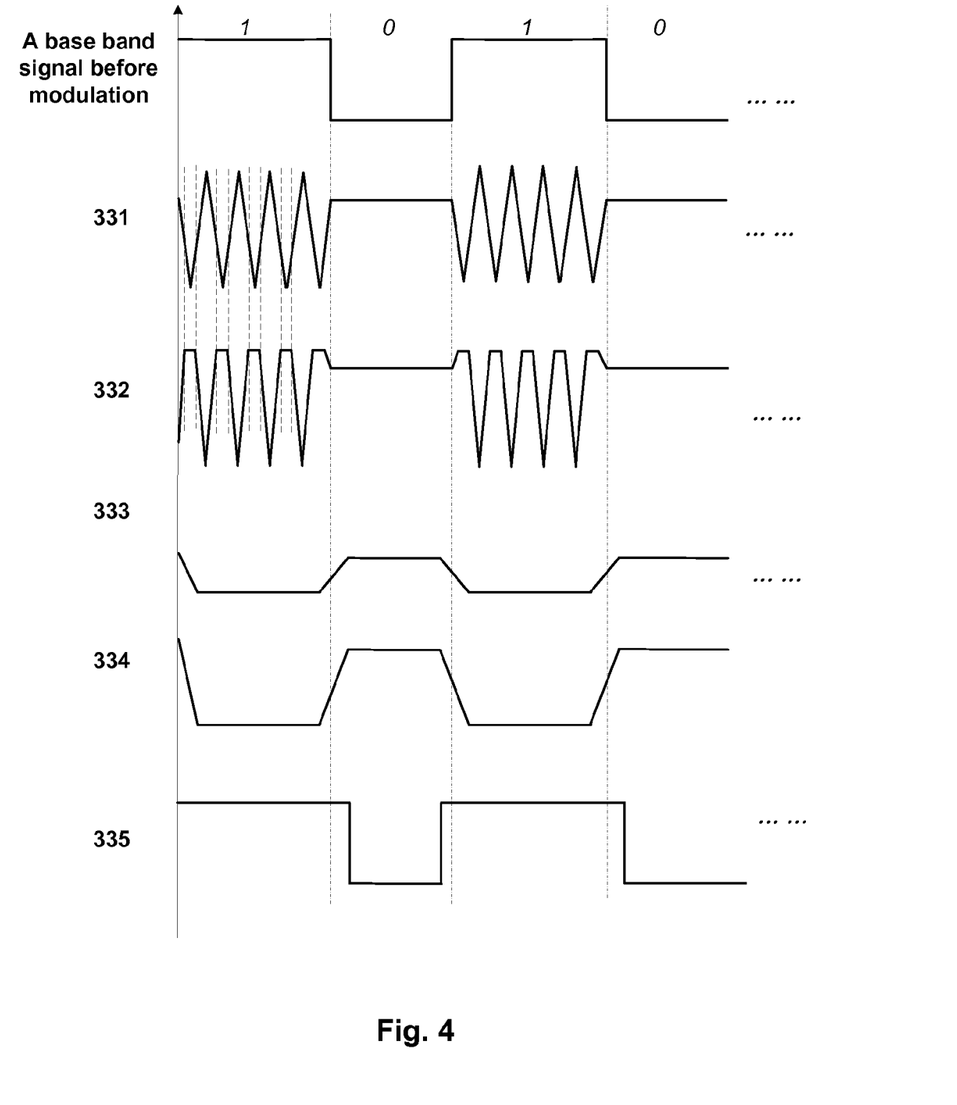
FIG. 4 is a drawing illustrating wave forms of signals according to an embodiment of the invention.

At the top of FIG. 4, a base band signal, e.g., a wake-up signal at 14 KHz, before modulation is illustrated.

The RSU 2 uses the base band signal to change the amplitude of a carrier signal with a frequency at 5.83-5.84 GHz, and emit a resultant ASK signal 330 to the OBU 3.

In the demodulator 30 at OBU 3, the ASK signal 330 is rectified. A drain signal 331 generated at the drain of the NMOS 313a in response to the input at the gate of the NMOS 313a is illustrated as signal 333.

Examining signal 331, signal 332 in FIG. 4 and equation (1), when signal 331 decreases, signal 332 rises. Due to the non-linear characteristic of NMOS 313a in sub-threshold status, $I_{DS}$ decreases sharply such that $I_{DS}$ finally can hardly affect the drain signal. As can be seen in FIG. 4, when signal 330 is near troughs of the wave, signal 331 is approximately a horizontal line. When signal 331 begins to rise from a trough, signal 332 will decrease very fast in response. According to an embodiment of the invention, NMOS 313a may be always working under a sub-threshold status under the action of signal 331. According to another embodiment of the invention, under the action of signal 331, NMOS 313a may temporarily and periodically enters a linear status, when signal 331 gets to a wave crest, signal 332 will be at a trough. The difference there between lies in the amplitude of signal 331.

Therefore, as can be seen from FIG. 4, when the base band signal is "1", due to the non-linear characteristic of the NMOS 313a, an upper portion of signal 332 is cut while a lower portion of signal 332 is amplified.

A drain signal 332 is acquired by the filter 301 that is typically a low-pass filter capable of remove high frequency carriers therefrom and generate a filtered signal 333.

The filtered signal 333 alternates between a first voltage and a second voltage, wherein the first voltage is higher than the second. In case the difference between the first voltage and second voltage is inadequate, as shown in FIG. 3, an amplifier 320 can be used to amplify the filtered signal 333 so as to generate an amplified signal 334. Therefore, by inputting the amplified signal 334 to an input end of a non-symmetrical comparator 321 and the filtered signal 333 to another input end of the comparator 321, a base band signal 335 as shown in FIG. 4 will be generated. The comparator 321 outputs "1" when the difference between the amplified signal 334 and the filtered signal 333 is larger or equal to a threshold, and outputs "0" when the difference is less than the threshold. The demodulator 30 maintains the frequency of the base band signal so that the generated base band signal 335 can be used by the wake-up circuit 31 for frequency detection.

Figure 5:
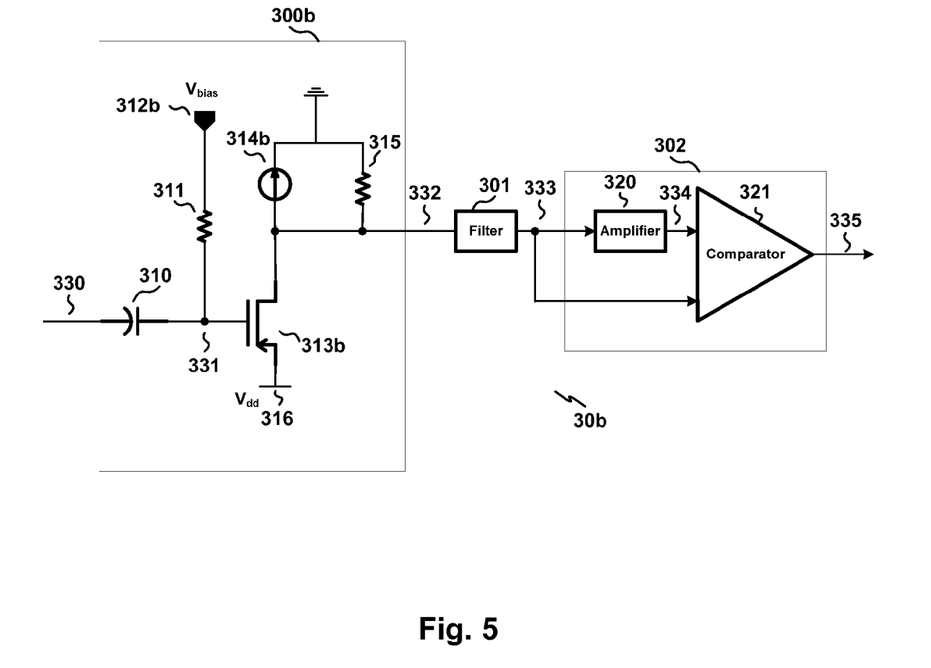
FIG. 5 is a circuit diagram illustrating a demodulator according to another embodiment of the invention.

The embodiment shown in FIG. 3 has variants including the one shown in FIG. 5. According to this variant, a P-type MOSFET (PMOS) 313b is used to replace the NMOS 313a. A bias voltage supply 312b supplies a voltage that is lower than the positive voltage provided by the positive voltage source 316 so as to bias the PMOS 313b in a sub-threshold status. Since the configuration of rectification circuit 300b mirrors the one of rectification 300a in FIG. 3, this variant can share the wave forms shown in FIG. 4. When a voltage of the signal 331 decreases, a current in the second resistor 315 increases which results in an increase in the voltage of the drain signal 332. When the voltage of the signal 332 increases, the current in the second resistor 315 decreases which results in a decrease in the voltage of the drain signal 332.

Figure 6:
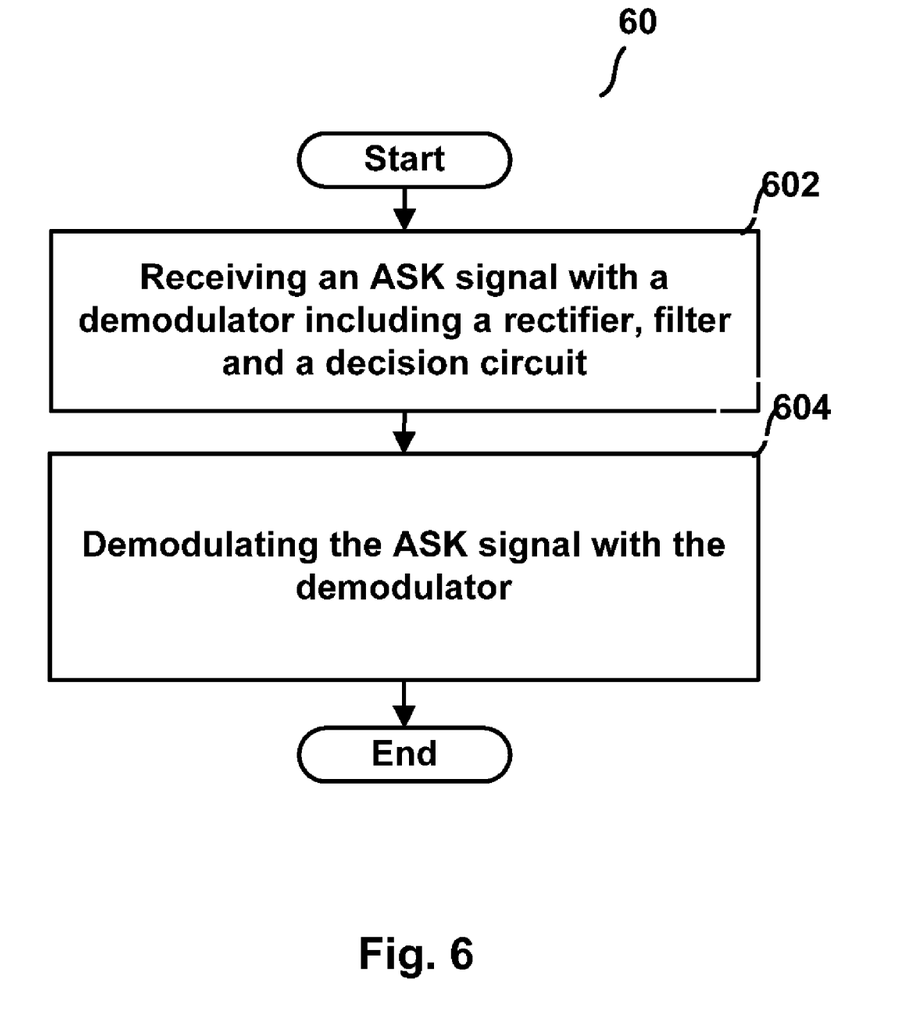
FIG. 6 is a flow chart of a method for demodulating an ASK signal according to an embodiment of the invention.

FIG. 6 is a flow chart of a method 60 for demodulating an ASK signal. In an embodiment of the invention, in step 602, receiving the ASK signal with a demodulator 30a as shown in FIG. 3, in step 604, demodulating the ASK signal with the demodulator 30a as discussed above. In another embodiment of the invention, in step 602, receiving the ASK signal with a demodulator 30b as shown in FIG. 5, in step 604, demodulating the ASK signal with the demodulator 30b as discussed above.

Those of ordinary skill in the art understand that the wave form of signal 332 is shown as linear to illustrate the change of wave forms more clearly, rather than to limit the scope of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A demodulator, comprising:
a rectification circuit comprising: a DC block, a first resistor, a MOSFET; a current source and a second resistor, wherein an end of the DC block is configured to receive an ASK signal, another end of the DC block is connected to an end of the first resistor and a gate of the MOSFET, another end of the first resistor is configured to receive a bias voltage, the current source and the second resistor are in a parallel connection and further connected to a drain of the MOSFET so as to form a series connection, the formed series connection is set between a positive voltage source and a ground;
a filter connected to the common terminal and configured to receive a drain signal generated on the common terminal, remove carriers from the drain signal to generate a filtered signal; and
a decision circuit connected to an output end of the filter and configured to receive the filtered signal and use the filtered signal to generate a base band signal.

2. The demodulator according to claim 1, wherein the MOSFET is a N-type MOSFET, a source of the N-type MOSFET is grounded, a negative terminal of the current source is connected to an end of the second resistor and a drain of the N-type MOSFET to form the common terminal, a positive terminal of the current source is connected to another end of the second resistor and the positive voltage source.

3. The demodulator according to claim 1, wherein the MOSFET is a P-type MOSFET, a source of the P-type MOSFET is connected to the positive voltage source, a positive terminal of the current source is connected to an end of the second resistor and a drain of the P-type MOSFET to form the common terminal, a negative terminal of the current source is connected to another end of the second resistor and grounded.

4. The demodulator of claim 1, wherein the decision circuit comprises:
an amplifier and a comparator, the amplifier is connected to the output end of the filter and configured to receive and amplify the filtered signal so as to generate an amplified signal, an input end of the comparator is connected to the output end of the filter and configured to receive the filtered signal, another input end of the comparator is connected to an output end of the amplifier and configured to receive the amplified signal; the comparator is configured to compare the filtered signal and the amplified signal to generate the base band signal.

5. A method for demodulating an ASK signal, comprising:
receiving the ASK signal with a demodulator, the demodulator including:
a rectification circuit comprising: a DC block, a first resistor, a MOSFET; a current source and a second resistor, wherein an end of the DC block is configured to receive an ASK signal, another end of the DC block is connected to an end of the first resistor and a gate of the MOSFET, another end of the first resistor is configured to receive a bias voltage, the current source and the second resistor are in a parallel connection and further connected to a drain of the MOSFET so as to form a series connection, the formed series connection is set between a positive voltage source and a ground;
a filter connected to the common terminal and configured to receive a drain signal generated on the common terminal, remove carriers from the drain signal to generate a filtered signal; and
a decision circuit connected to an output end of the filter and configured to receive the filtered signal and use the filtered signal to generate a base band signal;
demodulating the ASK signal with the demodulator.

6. The method according to claim 5, wherein the MOSFET is a N-type MOSFET, a source of the N-type MOSFET is grounded, a negative terminal of the current source is connected to an end of the second resistor and a drain of the N-type MOSFET to form the common terminal, a positive terminal of the current source is connected to another end of the second resistor and the positive voltage source.

7. The method according to claim 5, wherein the MOSFET is a P-type MOSFET, a source of the P-type MOSFET is connected to the positive voltage source, a positive terminal of the current source is connected to an end of the second resistor and a drain of the P-type MOSFET to form the common terminal, a negative terminal of the current source is connected to another end of the second resistor and grounded.

8. The method according to claim 5, wherein the decision circuit comprises:
an amplifier and a comparator, the amplifier is connected to the output end of the filter and configured to receive and amplify the filtered signal so as to generate an amplified signal, an input end of the comparator is connected to the output end of the filter and configured to receive the filtered signal, another input end of the comparator is connected to an output end of the amplifier and configured to receive the amplified signal; the comparator is configured to compare the filtered signal and the amplified signal to generate the base band signal.

9. An on board unit of an electronic toll collection system, comprising:
a demodulator configured to demodulate an ASK signal to obtain an base band signal;
a wake-up circuit connected to the demodulator and configured to receive the base band signal;
a primary circuit connected to the wake-up circuit;
wherein the demodulator comprises:
a rectification circuit comprising: a DC block, a first resistor, a MOSFET; a current source and a second resistor, wherein an end of the DC block is configured to receive an ASK signal, another end of the DC block is connected to an end of the first resistor and a gate of the MOSFET, another end of the first resistor is configured to receive a bias voltage, the current source and the second resistor are in a parallel connection and further connected to a drain of the MOSFET so as to form a series connection, the formed series connection is set between a positive voltage source and a ground;

a filter connected to the common terminal and configured to receive a drain signal generated on the common terminal, remove carriers from the drain signal to generate a filtered signal; and a decision circuit connected to an output end of the filter and configured to receive the filtered signal and use the filtered signal to generate a base band signal.

10. The on board unit according to claim 9, wherein the MOSFET is a N-type MOSFET, a source of the N-type MOSFET is grounded, a negative terminal of the current source is connected to an end of the second resistor and a drain of the N-type MOSFET to form the common terminal, a positive terminal of the current source is connected to another end of the second resistor and the positive voltage source.

11. The on board unit according to claim 9, wherein the MOSFET is a P-type MOSFET, a source of the P-type MOSFET is connected to the positive voltage source, a positive terminal of the current source is connected to an end of the second resistor and a drain of the P-type MOSFET to form the common terminal, a negative terminal of the current source is connected to another end of the second resistor and grounded.

12. The on board unit according to claim 9, wherein the decision circuit comprises:

an amplifier and a comparator, the amplifier is connected to the output end of the filter and configured to receive and amplify the filtered signal so as to generate an amplified signal, an input end of the comparator is connected to the output end of the filter and configured to receive the filtered signal, another input end of the comparator is connected to an output end of the amplifier and configured to receive the amplified signal; the comparator is configured to compare the filtered signal and the amplified signal to generate the base band signal.

* * * * *